United States Patent Office 3,363,020
Patented Jan. 9, 1968

3,363,020
DECOLORIZATION OF BIPHENYL
Theodore E. Majewski and Willard M. Gentry, Midland, Mich., assignors to The Dow Chemical Company, Midland, Mich., a corporation of Delaware
No Drawing. Filed Jan. 18, 1965, Ser. No. 426,410
3 Claims. (Cl. 260—674)

ABSTRACT OF THE DISCLOSURE

A method for decolorizing biphenyl which comprises adding a small amount of sulfuric acid to the crude commercial product, and distilling to produce a white product. The additive removes the color efficiently and inexpensively.

---

This invention relates to the decolorization of biphenyl.

Biphenyl is made commercially by the pyrolysis of benzene and is ordinarily separated from other pyrolysis products by fractional distillation. While the product thus obtained is of high purity (typically 99.5–99.8%), it has a distinct yellow color that is objectionable in many uses and that is not removed by redistillation. This color can be removed by recrystallization of the product from a suitable solvent but such operations are tedious and expensive when used on a large commercial scale.

According to the present invention, the color of biphenyl made by the pyrolysis of benzene can be substantially eliminated by mixing the colored material with a small amount of sulfuric acid and distilling the mixture to recover the biphenyl. This treatment can be applied to the commercially pure material or, more advantageously, can be applied to the crude pyrolysis product before distillation, thus producing a colorless product of high purity by a single distillation of the pyrolysis product.

The amount of sulfuric acid required is dependent somewhat on the purity of the biphenyl being treated but in any case is small. The commercially pure biphenyl can usually be adequately decolorized by as little as 0.05% by weight of ordinary concentrated sulfuric acid (95–98%). More dilute acid can be used since the water therein is removed during the subsequent distillation. The crude pyrolysis product may require 0.1%, or even more. Larger quantities, such as 1–5%, produce equally high-grade product but reduce the yield somewhat.

In distilling the acid-treated colored biphenyl it may be advisable to use reduced pressure since high temperatures may result in some discoloration.

The distillation of acid-treated biphenyl does not involve a difficult fractionation. When crude pyrolysis product is being processed, the still that is ordinarily used for distillation of this material is entirely adequate. The same type of still is, of course, likewise adequate for processing higher grade material.

The practice of the invention is illustrated by the following examples.

General procedure

In each test, about 100 g. of the material was distilled through a 1″ x 24″ glass Vigreux column under a constant pressure of about 20 mm. Two types of material were treated:

(1) "Crude" was the crude, undistilled pyrolysis product from which the unreacted benzene had been stripped. It contained about 80–85% of biphenyl and had a deep yellow color.

(2) "Com." was the commercial grade of biphenyl having a purity of 99.8% and a distinct yellow color.

Results of some typical experiments are shown in the following table. In each case the distillate was essentially pure biphenyl (ca. 99.8%).

| Example | Material Treated | Additive | | Distillate | |
|---|---|---|---|---|---|
| | | Acid | Percent by Weight | Percent Yield | Color |
| 1 | Com. | None | | | Yellow. |
| 2 | Crude | ____do____ | | 80.9 | Do. |
| 3 | Com. | H₂SO₄ (95.5%) | 5 | 90.8 | Colorless. |
| 4 | Com. | ____do____ | 0.27 | 96.8 | Do. |
| 5 | Com. | ____do____ | .08 | 98.2 | Do. |
| 6 | Com. | ____do____ | .03 | 97.5 | Lt. Yellow. |
| 7 | Crude | ____do____ | 10 | 71.9 | Colorless. |
| 8 | ____do____ | ____do____ | 5 | 79.1 | Do. |
| 9 | ____do____ | ____do____ | 0.21 | 81.7 | Do. |
| 10 | ____do____ | HCl (36%) | 10 | | Yellow. |
| 11 | ____do____ | Acetic | 13 | | Do. |

We claim:
1. The process for decolorizing colored biphenyl made by the pyrolysis of benzene comprising mixing therewith a small but effective amount of sulfuric acid and distilling the biphenyl from the mixture.
2. The process of claim 1 wherein the sulfuric acid is used in the amount of 0.05 to 5% by weight, based on the colored biphenyl.
3. The process of claim 1 wherein the colored biphenyl is the crude product produced by the pyrolysis of benzene.

References Cited

UNITED STATES PATENTS

| | | | |
|---|---|---|---|
| 913,780 | 3/1909 | Starke | 260—574 |
| 1,957,988 | 5/1934 | Tschunkur et al. | 260—670 |
| 2,185,406 | 1/1940 | Gould | 250—674 |

DELBERT E. GANTZ, *Primary Examiner.*

C. E. SPRESSER, *Assistant Examiner.*